United States Patent [19]
Moser et al.

[11] Patent Number: 5,828,492
[45] Date of Patent: Oct. 27, 1998

[54] GRATING STRUCTURE HAVING A PLURALITY OF BINARY LAMELLAR GRATINGS

[75] Inventors: Herbert Moser, Karlsruhe, Germany; Karl-Dieter Möller, Allendale, N.J.

[73] Assignee: Forschungszentrum Karlsruhe GmbH, Karlsruhe, Germany

[21] Appl. No.: 739,202

[22] Filed: Oct. 30, 1996

[30] Foreign Application Priority Data

Jun. 18, 1994 [DE] Germany .......................... 44 21 392.1

[51] Int. Cl.⁶ ............................................ G02B 5/18
[52] U.S. Cl. .................................. 359/575; 359/569
[58] Field of Search ............................ 359/575, 569, 359/572, 566, 568

[56] References Cited

U.S. PATENT DOCUMENTS 4,057,326  11/1977  Knop ........................................ 359/568

FOREIGN PATENT DOCUMENTS

| 0 649 037 | 4/1995 | European Pat. Off. | |
| 56-57010 | 5/1981 | Japan | 359/575 |
| 61-1712101 | 8/1986 | Japan | 359/569 |
| 91 12543 | 8/1991 | WIPO | |

*Primary Examiner*—Jon W. Henry
*Attorney, Agent, or Firm*—Klaus J. Bach

[57] ABSTRACT

In a grating structure for use in a Fourier spectrometer with a series of raised and recessed surfaces of optical quality, a plurality of binary lamellar gratings are provided which have distinct height differences and are arranged on different surface areas to provide a suitable diffractive-optical element.

7 Claims, 9 Drawing Sheets

Sectional

Top View

Position of Laserbeam Relative to Substrate

Steplike Profile in Resin Substrate

GRATING STRUCTURE HAVING A PLURALITY OF BINARY LAMELLAR GRATINGS

The invention relates to a grating structure for a Fourier spectrometer with a series of raised and recessed surface areas of optical quality.

Such a grating structure is disclosed for example by C. W. Haggans, et al., "LAMELLER GRATINGS AS POLARIZATION COMPOUNDS FOR SPECULARLY REFLECTED BEAMS", Journ. Of Modern Optics 40, 675–686 (1993).

Also known is a multi-channel Fourier spectrometer in which an incident light beam is split, by a Savert plate, into two partial beams which then are depicted on the picture plane of a CCD detector and which have there, dependent on their inclination with respect to the optical axes, a phase shift which is correlated to the incident location (Applied. Opt. 31, 6096 (1992)).

In such a multi-channel Fourier spectrometer, the amplitude of the incident beam is divided into two parts and the interferogram points are the result of the spatial intensity distribution of the two superimposed beam parts. The spatial points have a distance which corresponds to half the wave length of the incident light which has the shortest wave length. The realistic measurement intervals, whose centers have the desired distance cannot be point like, but must have a finite dimension. The dimension must be selected to be of sufficient size such that a certain signal can be recorded but also small enough that the modulation of the interferogram is not impaired. If the size of these intervals is for example 10% of the distance between the centers, 90% of the light is lost just for the evaluation of the interferogram.

Besides this, because of the Savert-plate, the principle is not suitable for miniaturization and mass fabrication.

It is the object of the invention to provide, by using the principle of wave front division, a suitable diffract optical element particularly for use in a Fourier spectrometer.

SUMMARY OF THE INVENTION

In a grating structure for use in a Fourier spectrometer with a series of raised and recessed surfaces of optical quality, a plurality of binary lamellar gratings are provided which have distinct height differences and are arranged on different surface areas to provide a suitable diffractive-optical element.

In accordance with the invention, Fourier spectrometer can be miniaturized by combining the wave front division principle with microtechnical manufacturing methods to such an extent that their size and costs are determined essentially by the CCD camera whereas the instruments in use today are suitcase-sized and are very expensive. The instrument according to the invention has automatically a plurality of channels, that is, it is also suitable for time independent measurements. Fields of application are environmental sciences, process control, analysis and air and space travel. The diffractive optical elements (DOE) which are used in the above mentioned Fourier spectrometers can generate intense color effects in the visible color range, which can be used as color codes on plastic cards and also for decorative purposes.

In contrast to the prior art, which uses amplitude division, in accordance with the invention wave front division of the incident light is utilized. The incident light is divided into NxN partial beams and for each one of the partial beams, one of the NxN, different optical phase differences is introduced. The detector receives the greatest part of the light of the NxN partial beams so that almost the whole incident light energy is utilized. Since the rays of each partial beam which are recorded by the detector have the same phase difference, optimum intensity and modulation of the interferogram are obtained.

If diffractive optical elements (DOE) with appropriately curved surfaces are used, there is no need in the spectrometer for focusing optics.

Various embodiments of the invention will be described below on the basis of the accompanying drawings.

DESCRIPTION OF PREFERRED EMBODIMENTS

The diffractive optical element or, respectively, the spectrometer comprises a surface area which is divided into NxN lamellar lattices, for example 8x8, wherein a lamellar lattice consists of a series of m webs and grooves, for example m=5. The web tops and the groove bottoms are flat surfaces of optical quality. This surface structure is made using the microtechniques described below:

Each lattice represents a certain optical pass difference for the interferogram. All together provide a signal curve as it would be generated by a movable Fourier spectrometer, but with the essential advantage that the interferogram is not recorded, as a function of time, but that all points are simultaneously present so that it is possible to perform Fourier spectroscopy in a real time dependent manner.

With the methods described below, such diffractive optical elements can be made directly, or mold inserts can be made from which the diffractive optical elements can be formed.

Figure 1:
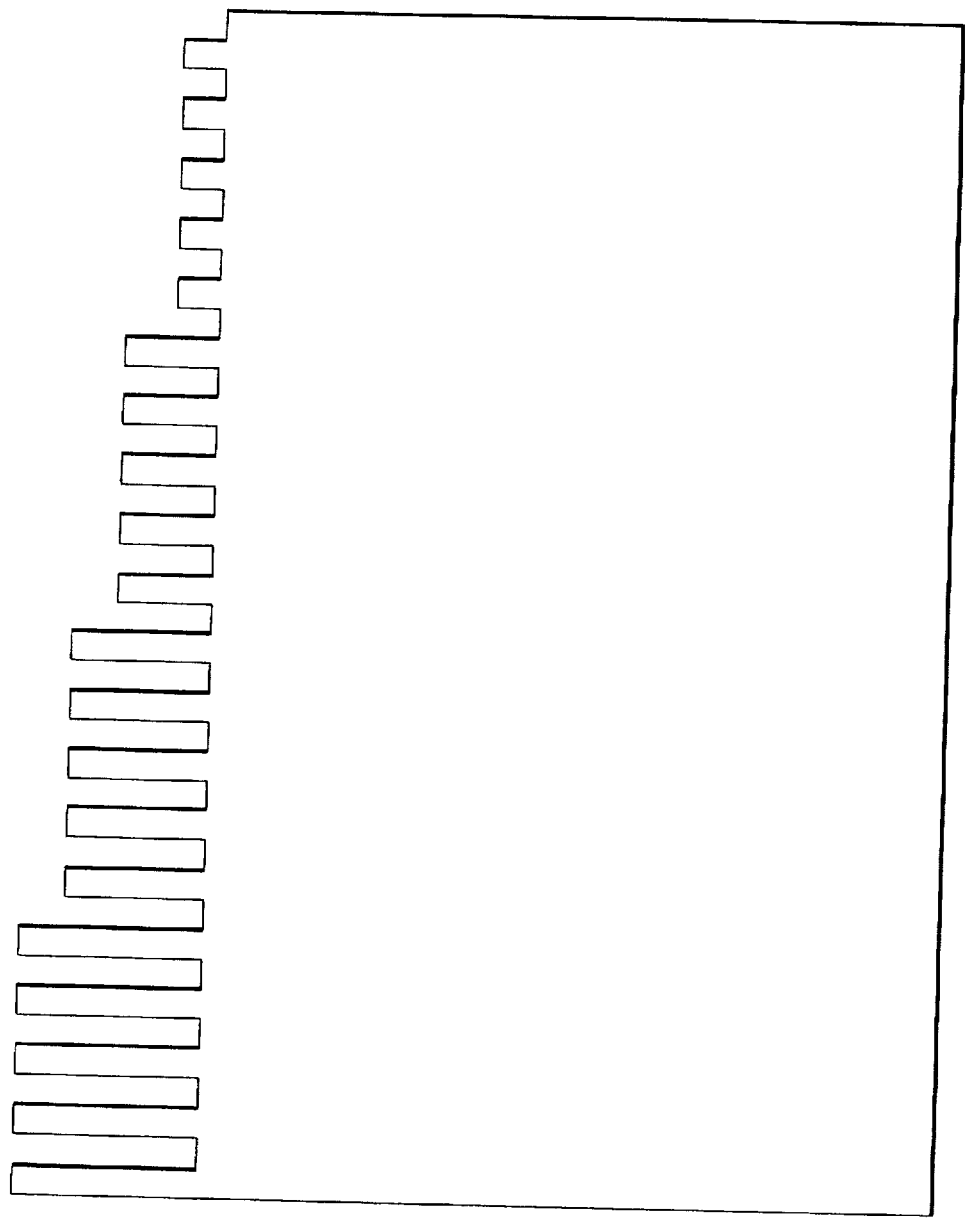
FIG. 1 shows a contoured platelet, made by LIGA techniques for building a mold insert.

Using the LIGA process, contoured platelets of a desired thickness between 10 $\mu$m and 500 $\mu$m, here for example 500 $\mu$m are first made (FIG. 1). The width of the grooves and webs is for example 100 $\mu$m each. Every five webs and grooves for example have the same depth and extend over a length of 1 mm. The depth varies from about 0.5 $\mu$m in steps of 0.5 $\mu$m to 32 $\mu$m, for applications with infrared light from 2 $\mu$m. The various depths of the lamellar lattice steps permit the generation of different optical pass differences. 16 of these contoured platelets are manufactured of which every two are identical. The distance between the bottom side of the platelets and the groove bottoms is the same in all platelets. The height of the webs or the depth of the grooves changes from pair to pair by 4 μm in the example selected here. The platelets are stacked up on a finely machined planar base plate and fixed by clamping means. The edge length of the stack is 8 mm in both directions. It is quite apparent that the contoured platelets to be made by LIGA could have also wave shapes which are not rectangular, but which are for example sinusoidal, sawtooth, or triangular shapes so that different interference effects can be obtained. It is also possible to use the mold inserts to make for example Bragg grating structures for use as light in- or out-coupling devices for polymer integrated optical components.

Figure 2:
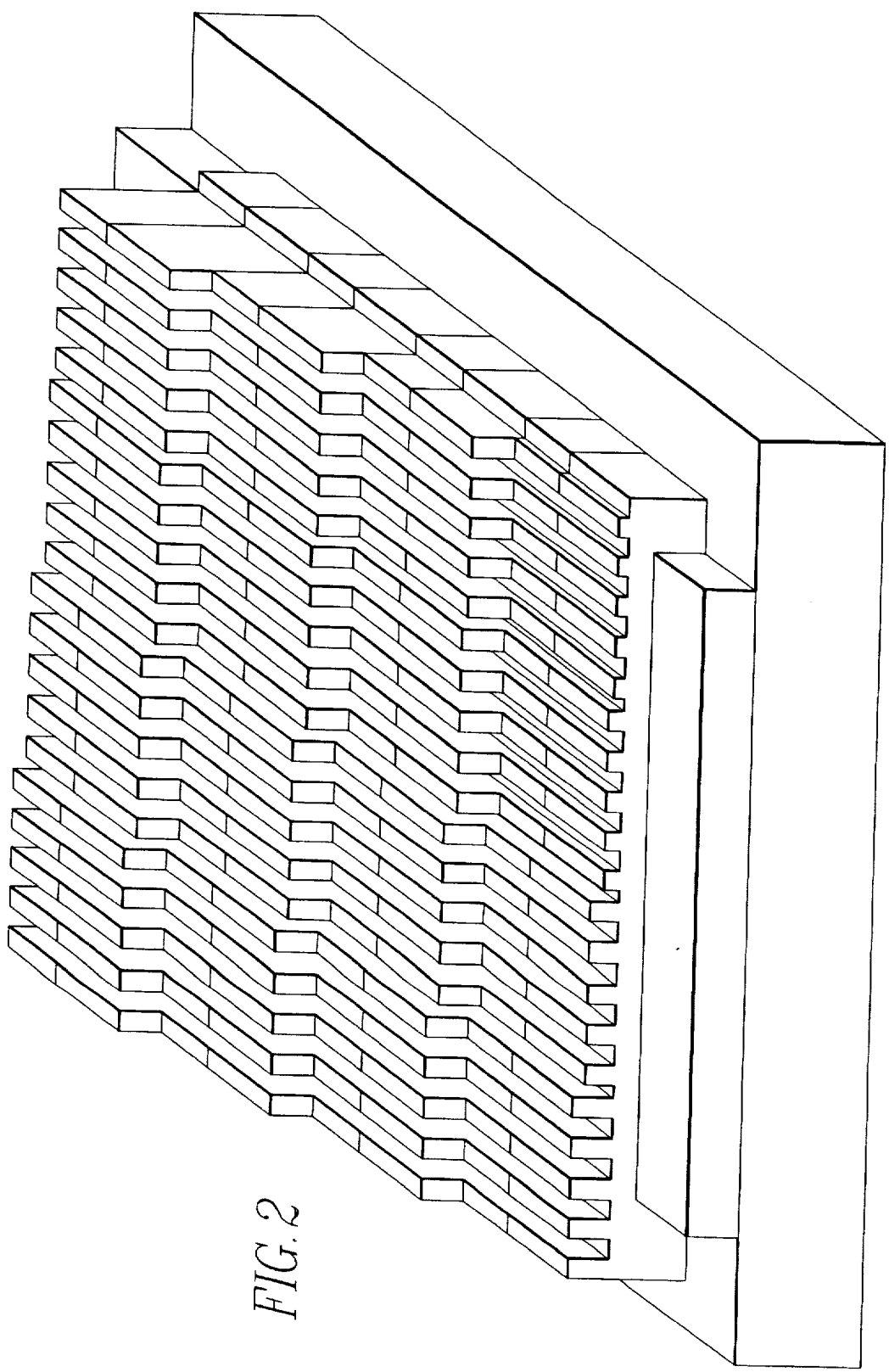
FIG. 2 shows an assembled mold insert.

This arrangement represents a DOE as well as a mold insert (FIG. 2: For simplicity reasons only, 4×4 array areas are shown), which can be used for injection or reaction molding or for stamping procedures. Using this mold insert, a plastic component, for example of PMMA or more heat resistant materials such as polyadapolyacrylate, polycarbonate (PC) or polyactylate is provided whose surface can be made reflective to any desired degree by depositing dielectric layers of a metal such as Al or Au by vapor deposition or sputtering.

The grooves can be filled with a material that has a high refraction index whereby the optical path length and the phase shift are increased as well as the mechanical strength is improved and the soiling sensitivity is reduced.

Figure 3:
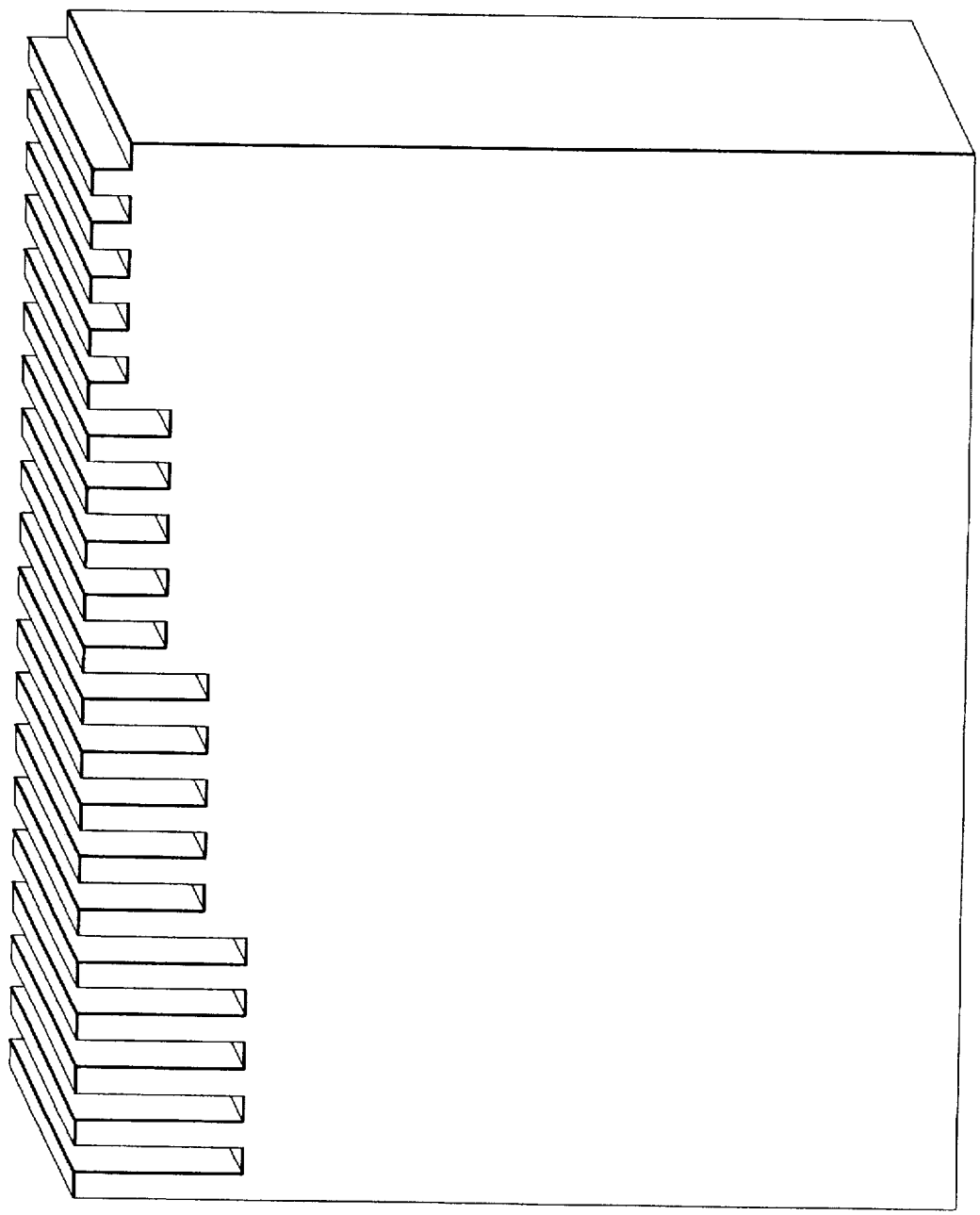
FIG. 3 shows the continuous platelet in an alternative form (isometric view)
Figure 4:
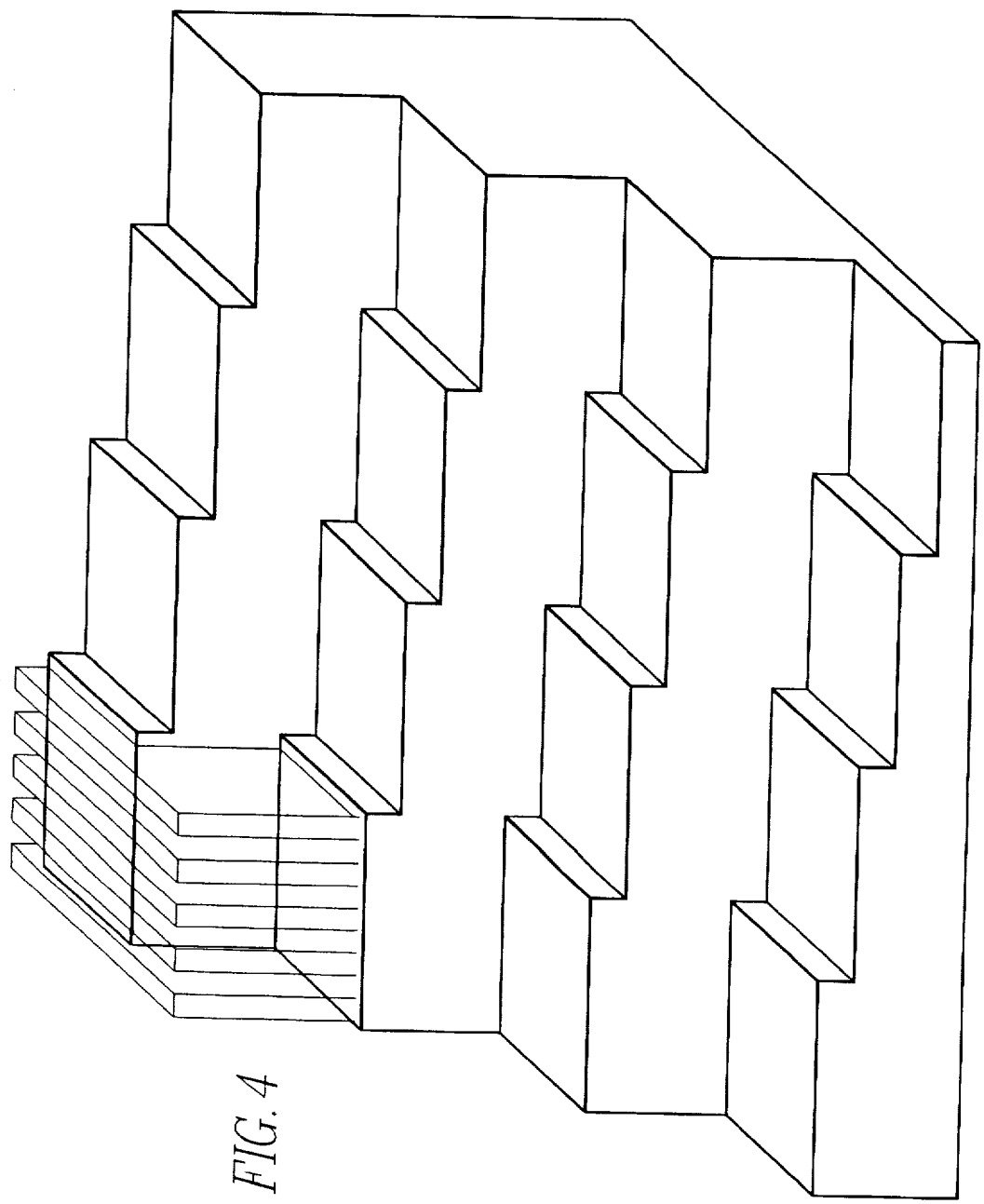
FIG. 4 shows platelets with checkerboard-like structure before the forming of a web and groove structure.

In this embodiment, the groove bottoms of the mold insert are at the same level. This may also be reversed so that the web tops of the mold insert are at the same level. Then the platelets are different and appear as shown in FIG. 3. Furthermore, the mold insert could be made with step-like formed platelets as shown in FIG. 4. They can then be stacked and their surfaces can then be covered by an x-ray resist such as PMMA and a striped groove pattern can be transferred to the x-ray resist by means of x-ray depth lithography which, after development, is galvanically filled so that the webs are formed. After plane machining and polishing of the surface, the resist is stripped by re-exposure and developing in an oxygen plasma or by Excimer laser ablation so that the finished interferometer surface is provided which may also serve as a mold insert for a subsequent plastic molding procedure.

Figure 5A:
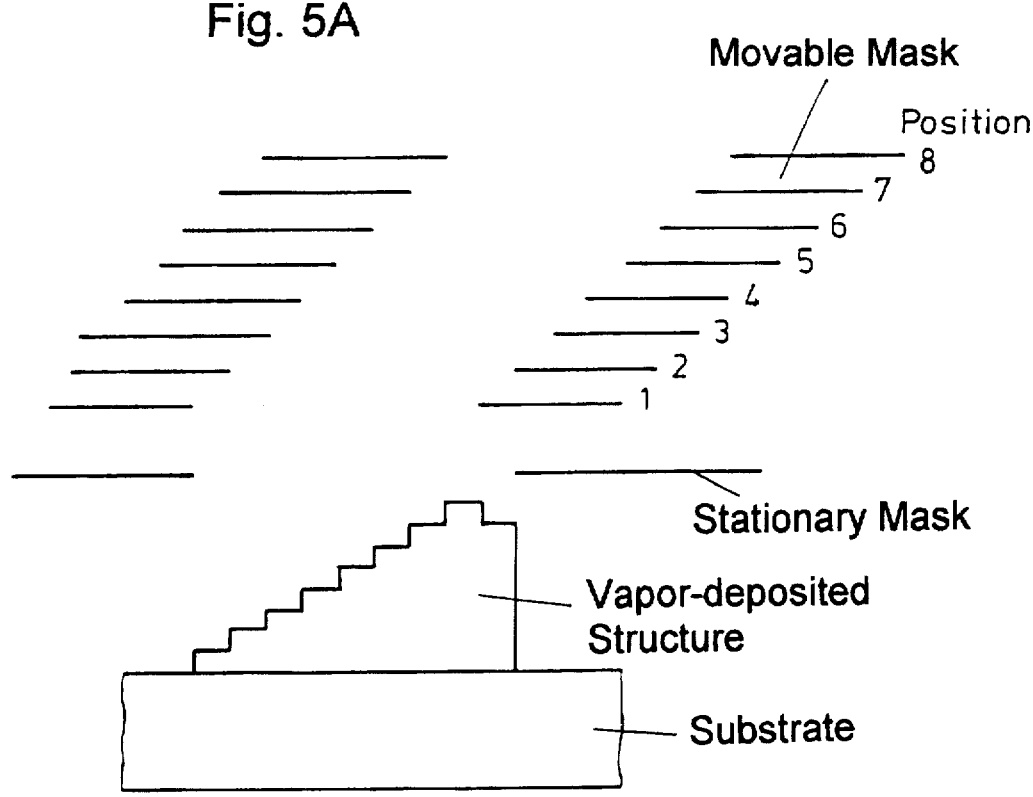
FIGS. 5A and 5B show the forming of the steps by locally limited layer deposition (vapor deposition, sputtering).
Figure 5B:
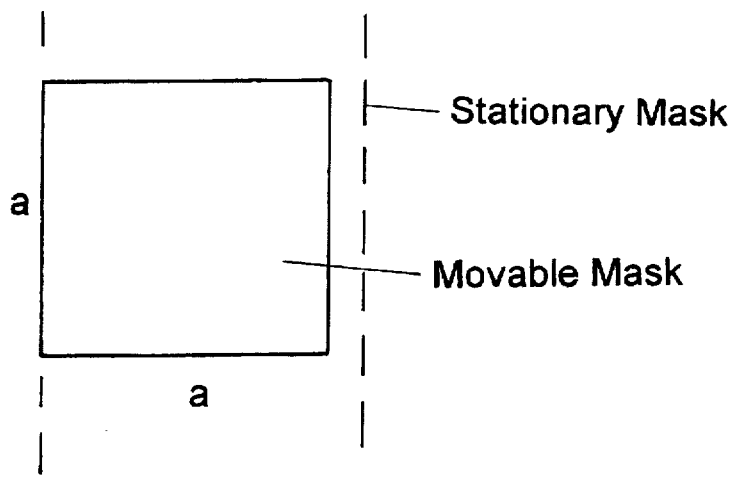

While the process which utilizes the LIGA procedure is particularly well suited for the infrared range, the following process which is based on thin film methods is suitable for the ultraviolet spectral area because the step heights to be provided are substantially lower. In this case, layers of different thicknesses are deposited on a substrate in a spatially structured manner. FIG. 5A shows how the local layer thickness is controlled by providing various light masks. A stationary mask with a square opening a×a (FIG. 5B) defines the deposit area. Below the stationary mask, there is provided a movable slot mask with a slot width a(1−1/N). In each position of the movable mask, a certain layer thickness of a suitable material such as Al or Au as determined by the design data of the interferometer is deposited by vapor deposition or sputtering so that a first step structure is generated. Then the arrangement is turned by 90° and a second step structure is superimposed on the first step structure in a direction normal thereto. The step height of the second step structure is smaller. It is 1/N of the height of the first step structure. In this manner, a surface area is generated which is checker board-like divided into areas of different heights as shown in FIG. 4. In the nest step, this area is covered by an x-ray resist such as PMMA as described above. Into the resist a groove stripe pattern is transferred by x-ray depth lithography, which after developing, is filled galvanically so that the webs are provided. After stripping of the resist by re-exposure and developing in an oxygen plasma or by Excimer laser ablation the finished interferometer is obtained which may be used as a mold insert for the subsequent plastic molding step.

Figure 6:
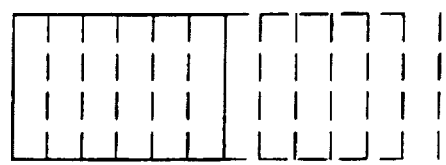
FIG. 6 shows stepped surfaces made on plastic material by ablation using Excimer lasers. The steps are formed by lateral movement of the sample table with respect to the rectangular laser beam.
Figure 6:
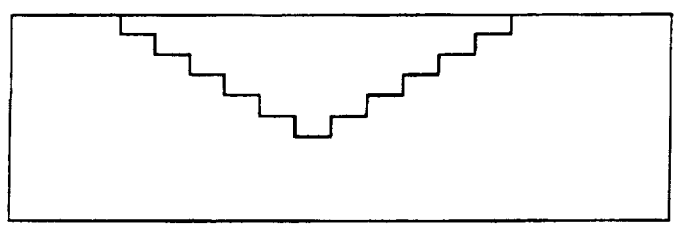

In a third manufacturing method the ablation of plastics by irradiation with Excimer laser light is utilized. In this method, a platelet sample of a suitable plastic material such as PMMA is irradiated by an Excimer laser for example an ArF laser with a wave length of 193 nm whereby material is removed from the surface. With a mask through which the platelet is irradiated a sharply limited rectangular light spot is generated on the material surface. Successive moving of the sample table in two directions which are normal to each other provides for a stepped material removal whereby, again, a checkerboard of areas of different heights is generated (FIG. 6). With this method two structures are formed in one method step. The webs are then built up as already described.

Combinations of these methods can be utilized and may even be economically desirable. Also, the arrays so made can be coated with metals such as aluminum or silver or with plastic such as PTFE in order to improve the optical reflection properties or the chemical resistance. The lamellar grating arrays so produced together with optical elements, a mask plate which is also made by microtechniques and a diode array—or CCD camera with controller and computer evaluation make up the complete Fourier spectrometer system. Depending on the wavelength range such systems can operate on the basis of reflection (FIG. 7) or transmission (FIG. 8).

Figure 7:
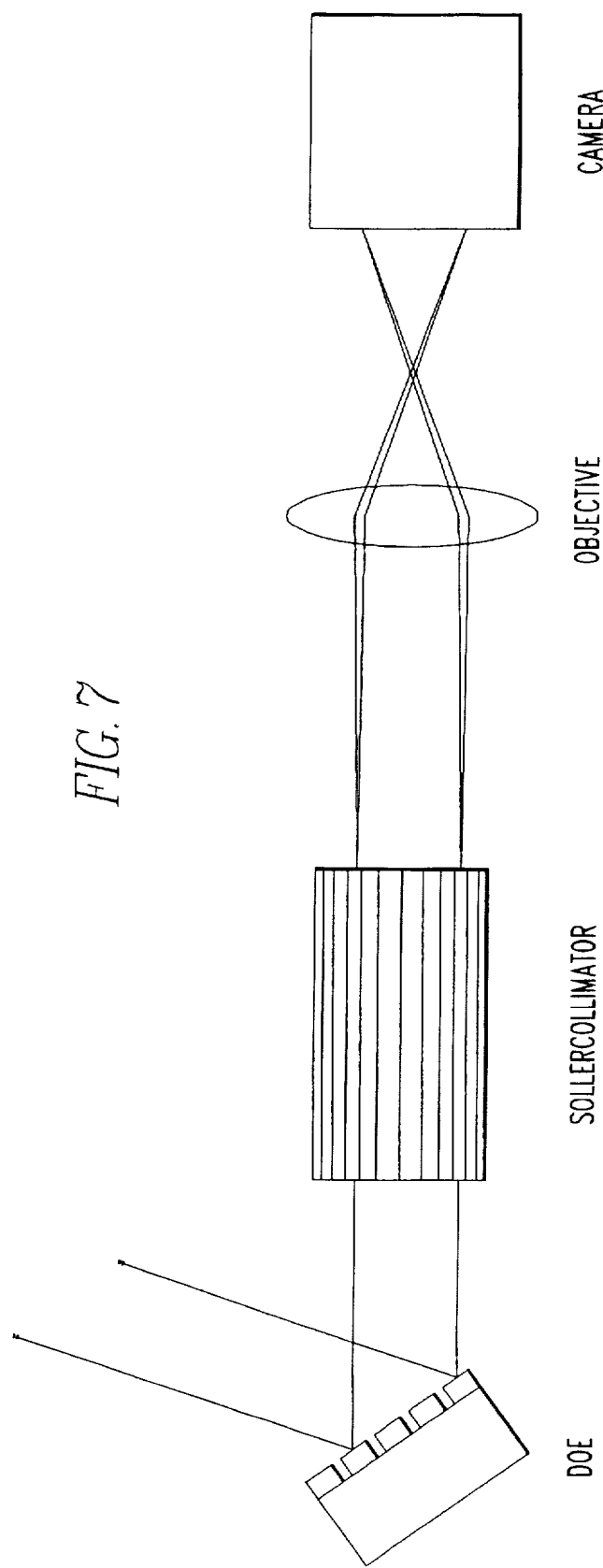
FIG. 7 shows a Fourier spectrometer operating on the basis of reflection.

As shown in FIG. 7, a light beam of parallel or optically collimated light is directed onto the surface of the DOE where it is divided, by reflection, into coherent partial beams which have experienced a certain phase shift. Then the reflected light beam passes through a collimator or a set of masks whereby only the $0^{th}$ diffraction order is permitted to pass. This collimator must have an aspect ratio which is greater than the ratio of the grating constant to the shortest wave length, that is, it is generally larger than 100. It is made for example by a LIGA technique. The local resolution detector can then be connected directly to the collimator or an optical arrangement of lenses, or concave mirrors may be arranged in between whereby the surface of the DOE is depicted on the detector. The Fourier spectrum can be read on the camera dependent on the location.

Figure 8:
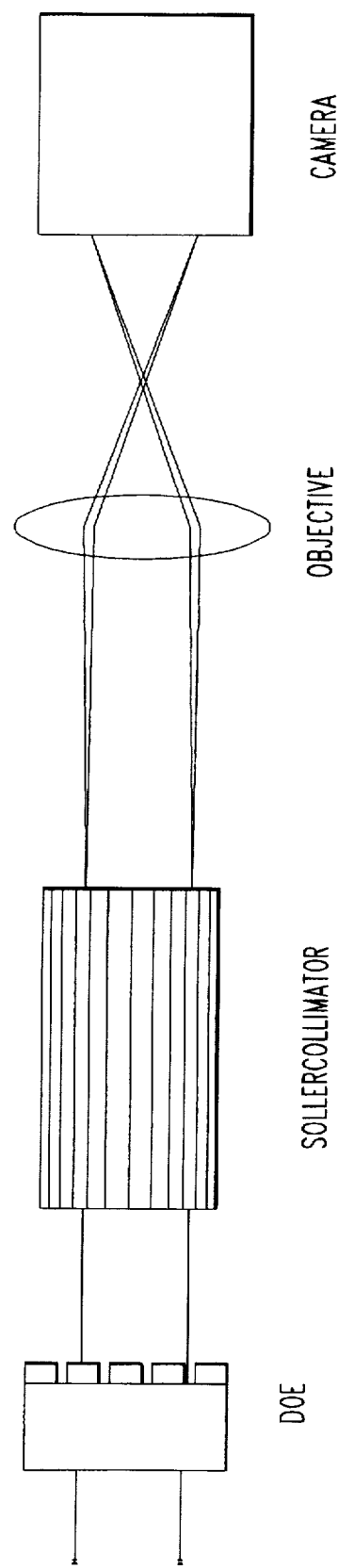
FIG. 8 shows a Fourier spectrometer operating on the basis of transmission.

In arrangement of FIG. 8, there is also a parallel or optically collimated light beam directed onto the surface of the DOE and is divided during transmission into N×N coherent partial beams in which again one half of the light beam has experienced a certain phase shift. In this case, photo lime Gel may be advantageously used as material which exhibits good transmission characteristics also in the near infrared area. This gel is described in R. T. Chen, Polymer-based Photonic Integrated Circuits, Optics & Laser Technology 25 (1993). Like in FIG. 7, a collimator, an optional lens and a camera are used.

In transmission, it is possible by using a DOE of two materials, to utilize also the refraction index difference of the materials for determining the phase difference. As a result, the step heights can be greater. This is of particular interest for the visible and the near ultraviolet range since the step heights must normally be very small in these areas.

Figure 9:
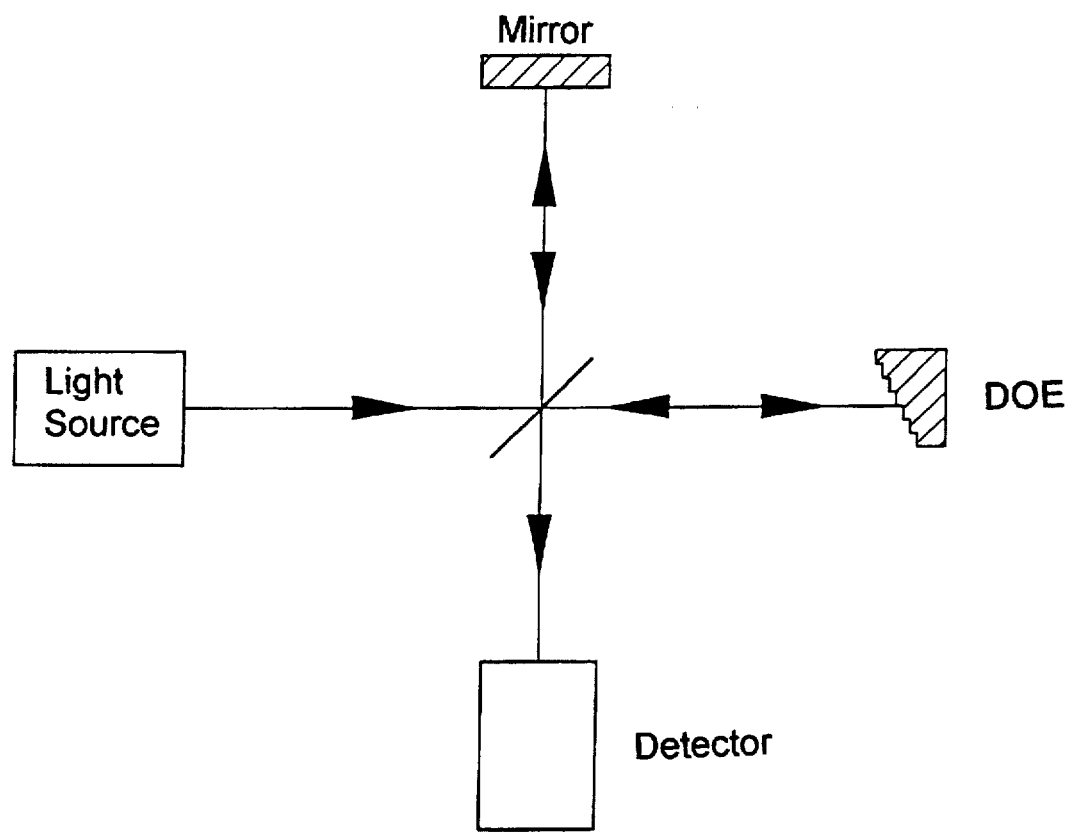
FIG. 9 shows a Fourier spectrometer without moving parts in the form of a Michelson interferometer with one mirror being a checkerboard-like stepped diffractive optical element.

The platelet shown in FIG. 4 can also be used as one of the two mirrors of a Michelson-interferometer which is then capable of providing an instantaneous Fourier spectrum also without using moving parts (FIG. 9). The advantage of such an arrangement is that the distances of the two mirrors from the beam divider can be so selected that either a double-sided symmetrical interferogram or a one-sided symmetrical interferogram can be recorded which are distinct by the resolution and the definition of the zero line. The one-sided interferogram has twice the resolution whereas the double-sided interferogram defines the zero line. These two options cannot be realized by an all-grating DOE. It is further possible herewith to cut, right from the start, the peaks of the $0^{th}$ order out of the signal received from the detector whereby the dynamic range can be substantially expanded.

The typically selected phase shift within a partial beam is a multiple of $2\pi$ times the shortest wave length.

The resolution of Fourier spectrometers is determined by the product of the maximum shift and the wave number, that is, $N^2/2$.

What is claimed:

1. A grating structure for use in a Fourier spectrometer with a series of alternately raised and recessed surface areas of optical quality, said grating structure having a plurality of binary lamellar gratings arranged on different surface areas and including at least 64 surface pairs with 64 distinct height differences.

2. A grating structure according to claim 1, wherein said height differences are in the $\mu$m range.

3. A grating structure according to claim 1, wherein said surface areas have a side length of between 0.01 and 0.5 mm.

4. A grating structure according to claim 1, wherein several surface pairs are present for each height difference.

5. A grating structure according to claim 1, wherein adjacent raised and recessed surface areas extend essentially in a parallel fashion.

6. A grating structure according to claim 1, wherein said raised and recessed surface areas are arranged in a linear fashion.

7. A grating structure according to claim 1, wherein said raised and recessed surface areas are arranged in the form of a two-dimensional field.

* * * * *